(12) United States Patent
Jung (10) Patent No.: US 11,661,982 B2
(45) Date of Patent: May 30, 2023

(54) ELECTRONIC PARKING BRAKE DEVICE (71) Applicant: HYUNDAI MOBIS Co., Ltd., Seoul (KR)

(72) Inventor: Min Kyu Jung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 203 days.

(21) Appl. No.: 17/137,554

(22) Filed: Dec. 30, 2020

(65) Prior Publication Data

US 2021/0364050 A1 Nov. 25, 2021

(30) Foreign Application Priority Data

May 20, 2020 (KR) ........................ 10-2020-0060288

(51) Int. Cl.
| | |
|---|---|
| *F16D 51/24* | (2006.01) |
| *F16D 65/22* | (2006.01) |
| *F16D 51/22* | (2006.01) |
| *B60T 1/06* | (2006.01) |
| *F16D 127/02* | (2012.01) |

(Continued)

(52) U.S. Cl.
CPC .............. *F16D 51/24* (2013.01); *B60T 1/067* (2013.01); *F16D 51/22* (2013.01); *F16D 65/22* (2013.01); *B60T 2270/402* (2013.01); *F16D 2121/04* (2013.01); *F16D 2121/24* (2013.01); *F16D 2125/32* (2013.01); *F16D 2127/02* (2013.01)

(58) Field of Classification Search
CPC ...... F16D 65/22; F16D 51/22; F16D 2121/02; F16D 51/24; F16D 2121/24; F16D 51/18; F16D 51/50; F16D 51/30; F16D 51/52; F16D 65/10; F16D 65/561; F16D 2127/08; F16D 13/02; F16D 2051/001; F16D 65/38; F16D 65/546; F16D 51/20; F16D 2121/04; F16D 2125/32; F16D 2127/02; B60T 13/741; B60T 13/74; B60T 1/067; B60T 2270/402
See application file for complete search history.

(56) References Cited

U.S. PATENT DOCUMENTS

| | | | | |
|---|---|---|---|---|
| 2,140,741 A | * | 12/1938 | Goepfrich | ............... F16D 51/48 |
| | | | | 188/79.61 |
| 3,977,500 A | * | 8/1976 | Farr | ........................ F16D 51/20 |
| | | | | 188/196 D |

(Continued)

FOREIGN PATENT DOCUMENTS

| | | | | |
|---|---|---|---|---|
| CN | 207049229 U | * | 2/2018 | |
| DE | 102006009088 A1 | * | 8/2007 | ............. F16D 51/20 |

(Continued)

*Primary Examiner* — Bradley T King
*Assistant Examiner* — Mahbubur Rashid
(74) *Attorney, Agent, or Firm* — H.C. Park & Associates, PLC (57) ABSTRACT An electronic parking brake device including: a plate part having a brake shoe rotatably mounted thereon; a housing part mounted on the plate part and configured to guide hydraulic pressure; a motor part mounted on the housing part, and driven when power is applied thereto; a piston part mounted on the housing part, and moved by hydraulic pressure so as to operate the brake shoe; and an operation part embedded in the housing part, disposed between the piston parts, and driven by the motor part so as to push the piston parts.

9 Claims, 6 Drawing Sheets (51) Int. Cl.
*F16D 121/04* (2012.01)
*F16D 121/24* (2012.01)
*F16D 125/32* (2012.01)

(56) References Cited

U.S. PATENT DOCUMENTS

| | | | | |
|---|---|---|---|---|
| 5,531,298 A | * | 7/1996 | Brooks, Sr. | F16D 65/22 188/250 F |
| 5,806,635 A | * | 9/1998 | Bae | F16D 65/22 188/79.62 |
| 2012/0205209 A1 | * | 8/2012 | Tsuzuku | F16D 65/58 188/325 |

FOREIGN PATENT DOCUMENTS

| | | | | |
|---|---|---|---|---|
| DE | 102014226265 A1 | * | 6/2016 | |
| JP | 2003056606 A | * | 2/2003 | ............. F16D 65/22 |
| KR | 101125300 B1 | * | 8/2005 | |
| KR | 20120062331 A | * | 6/2010 | |
| KR | 101207874 B1 | * | 9/2011 | |
| WO | WO-2007099040 A1 | * | 9/2007 | ............. F16D 51/18 |

\* cited by examiner

ELECTRONIC PARKING BRAKE DEVICE

CROSS-REFERENCE TO RELATED APPLICATION

This application claims priority from and the benefit of Korean Patent Application No. 10-2020-0060288, filed on May 20, 2020, which is hereby incorporated by reference for all purposes as if set forth herein.

BACKGROUND

Field

Exemplary embodiments of the present disclosure relate to an electronic parking brake device, and more particularly, to an electronic parking brake device which can implement electronic parking braking and driving braking in a small vehicle with a small wheel layout, using hydraulic pressure.

Discussion of the Background

In general, an electronic drum brake is designed to have a structure in which a parking part and a hydraulic piston serving as a main brake part are separated from each other. When hydraulic pressure is applied to the hydraulic piston during main parking, a shoe assembly pressurizes a drum to reduce the speed of the vehicle. When the vehicle is parked, an actuator is operated to rotate a worm gear and a bolt screw, with the hydraulic piston pressurized. Then, a parking piston pressurizes the shoe assembly to additionally generate a parking force.

In the related art, however, since the parking part and the hydraulic piston serving as the main brake part are separated from each other in a 2-row structure, it is difficult to reduce the size of the electronic drum brake. Thus, it is difficult to use the electronic drum brake as a drum parking brake of a small vehicle. Therefore, there is a need for a device capable of solving the problem.

The above information disclosed in this Background section is only for enhancement of understanding of the background of the invention and, therefore, it may contain information that does not constitute prior art.

SUMMARY

Exemplary embodiments of the present invention are directed to an electronic parking brake device which can implement electronic parking braking and driving braking in a small vehicle with a small wheel layout, using hydraulic pressure.

In an embodiment, an electronic parking brake device may include: a plate part having a brake shoe rotatably mounted thereon; a housing part mounted on the plate part and configured to guide hydraulic pressure; a motor part mounted on the housing part, and driven when power is applied thereto; a piston part mounted on the housing part, and moved by hydraulic pressure so as to operate the brake shoe; and an operation part embedded in the housing part, disposed between the piston parts, and driven by the motor part so as to push the piston parts.

The housing part may include: a body having the motor part mounted therein; a body operation hole formed in the body, and configured to form a side-to-side moving space of the piston part; a body hydraulic hole formed in the body and configured to guide hydraulic pressure and communicate with the body operation hole; and a body operation hole formed in the body, and configured to form an insertion space of the motor part.

The motor part may include: a motor case mounted on the housing part; a motor driver embedded in the motor case, and driven when power is applied thereto; and a motor shaft rotated by the motor driver, and configured to move the operating part.

The piston part may include: a pair of piston rod parts inserted into the housing part; a piston support part formed at one end of each of the piston rod parts, and configured to support the brake shoe; and a piston transfer part formed at the other end of the piston rod part such that the operation part is inserted into the piston transfer part, and configured to transfer a rotational force of the operation part.

The piston transfer part may include: a transfer seating surface having the operation part seated thereon; a transfer curved surface having a curvature at an end of the transfer seating surface; and a transfer inclined surface formed in an oblique direction from the transfer curved surface, and configured to restrict the operation part from rotating and separating.

The operation part may be brought into surface contact with the transfer curved surface, and rotated.

The operation part may include: an operation nut part embedded in the housing part, and linearly moved by the motor part; a pair of operation pressurization parts supported by the operation nut part, inserted into the respective piston transfer parts, and configured to push the respective piston transfer parts while rotated by the pressurization of the operation nut part; and an operation restoration part configured to provide a restoring force to the operation pressurization part.

The tops of the pair of operation pressurization parts may be disposed adjacent to each other and supported by the operation nut part, and the bottoms of the pair of operation pressurization parts may be obliquely disposed so as to be spaced apart from each other, and supported by the respective piston transfer parts.

The operation restoration part may include: a restoration center part disposed between the operation pressurization parts; and a restoration coupling part extended from the restoration center part and configured to cover the operation pressurization parts.

The restoration center part may have a curvature in which an upper end thereof becomes the highest point.

The electronic parking brake device in accordance with the embodiment of the present disclosure may perform main braking using hydraulic pressure. Furthermore, while rotated by the operation of the motor part, the operation part may push the piston parts disposed on both sides of the operating part, thereby providing a parking braking force. At this time, the piston parts may be disposed in the same space by the operation part, thereby reducing the size of a product.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, an electronic parking brake device will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
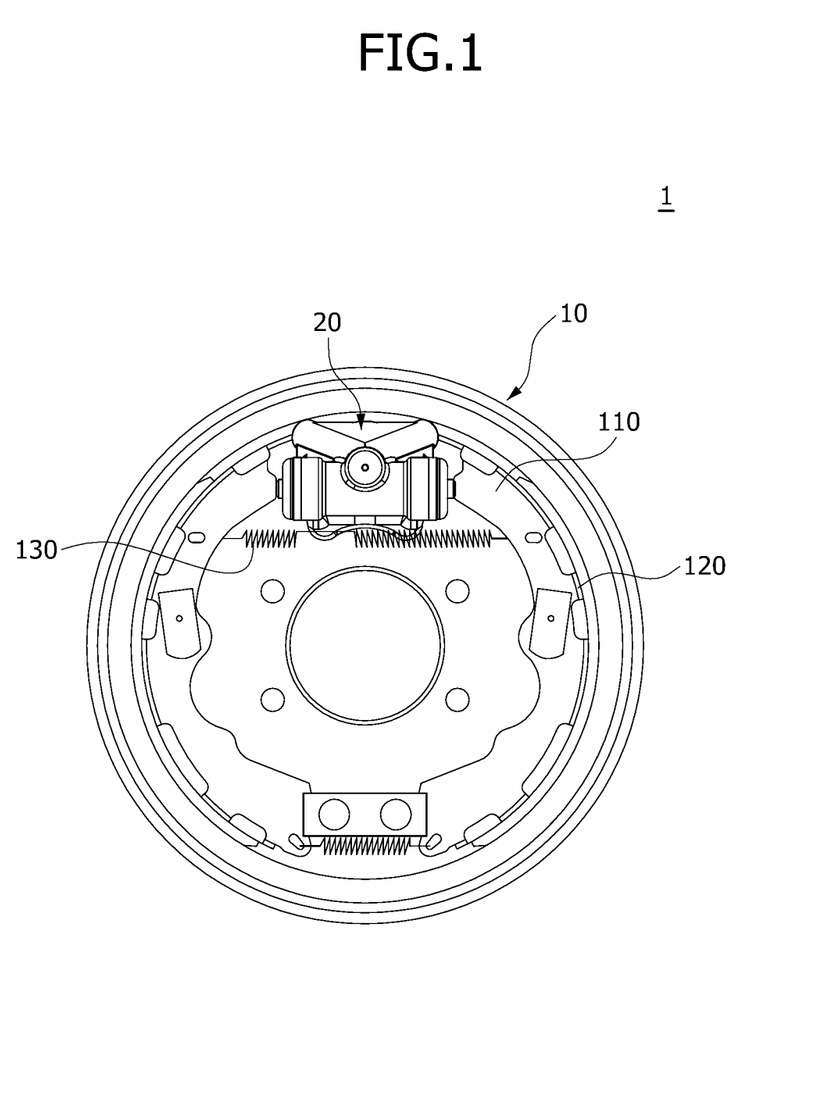
FIG. 1 is a diagram schematically illustrating an electronic parking brake device in accordance with an embodiment of the present disclosure.
Figure 2:
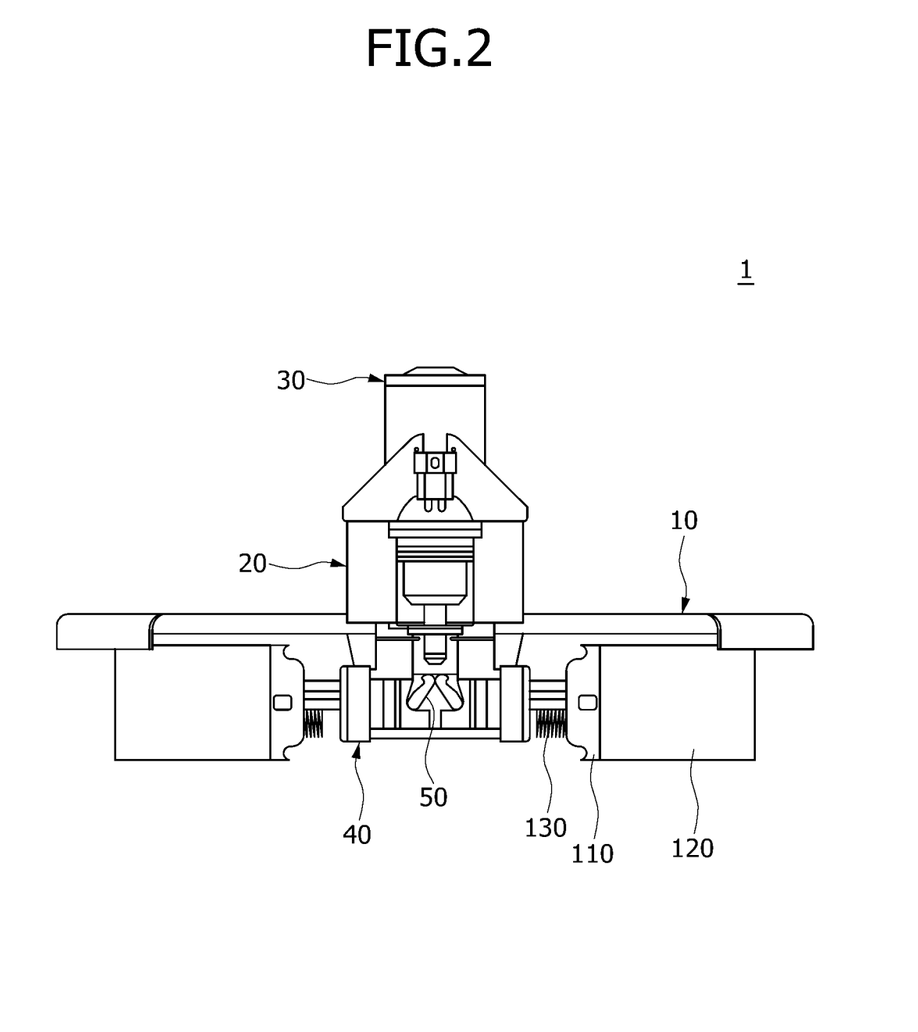
FIG. 2 is a cross-sectional view schematically illustrating the inside of the electronic parking brake device in accordance with the embodiment of the present disclosure.

FIG. 1 is a diagram schematically illustrating an electronic parking brake device in accordance with an embodiment of the present disclosure, and FIG. 2 is a cross-sectional view schematically illustrating the inside of the electronic parking brake device in accordance with the embodiment of the present disclosure. Referring to FIGS. 1 and 2, an electronic parking brake device 1 in accordance with the embodiment of the present disclosure includes a plate part 10, a housing part 20, a motor part 30, a piston part 40 and an operation part 50.

The plate part 10 is mounted on a vehicle body, and has a pair of brake shoes 110 rotatably mounted thereon. For example, the brake shoes 110 may be disposed symmetrically with each other, and the bottoms thereof may be rotatably mounted on the plate part 10. The brake shoe 110 may have a lining 120 attached to the outside thereof and contacted with a drum. Furthermore, a restoring spring 130 may have one end connected to the brake shoe 110 and the other end connected to the plate part 10 or have both ends connected to the brake shoes 110, respectively, and restore the brake shoe 110, from which an external force is removed, to the original position.

The housing part 20 is mounted on the plate part 10, and guides hydraulic pressure. For example, the housing part 20 may be bolt-coupled to the plate part 10, and connected to a flow path of a hydraulic brake device to supply hydraulic pressure for main braking.

The motor part 30 is mounted on the housing part 20, and driven when power is applied thereto. For example, the motor part 30 may be bolt-coupled to the housing part 20. A part of the motor part 30 may be embedded in the housing part 20, and provide power.

The piston part 40 is mounted on the housing part 20, and moved by hydraulic pressure so as to operate the brake shoe 110. For example, the piston part 40 may be disposed on each of the left and right sides of the housing part 20, and generate a braking force by pushing an upper end of the corresponding brake shoe 110.

The operation part 50 is embedded in the housing part 20, and disposed between the piston parts 40. The operation part 50 is driven by the motor part 30 and pushes the piston part 40. That is, the piston part 40 may be operated by hydraulic pressure supplied to the housing part 20, or operated by the motor part 30 so as to generate a braking force.

Figure 3:
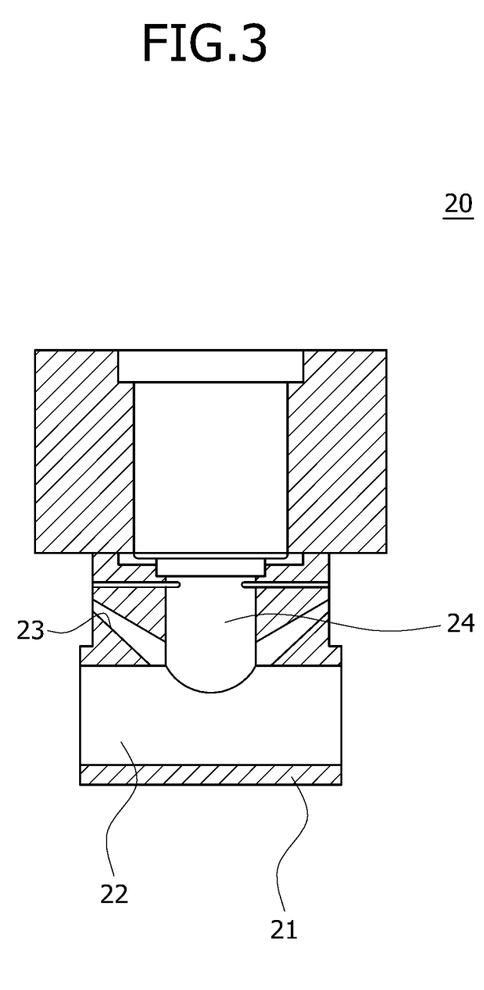
FIG. 3 is a diagram schematically illustrating a housing part in accordance with the embodiment of the present disclosure.

FIG. 3 is a diagram schematically illustrating the housing part in accordance with the embodiment of the present disclosure. Referring to FIG. 3, the housing part 20 in accordance with the embodiment of the present disclosure includes a body 21, a body operation hole 22, a body hydraulic hole 23 and a body insertion hole 24.

The body 21 is installed in the plate part 10, and have the motor part 30 mounted thereon. For example, the body 21 may be disposed through the plate part 10, the motor part 30 may be bolt-coupled to the rear surface of the body 21, and the circumference of the body 21 may be mounted on the plate part 10 such that the body 21 is fixed. The body 21 may be disposed between the pair of brake shoes 110.

The body operation hole 22 is formed in the body 21, and forms a side-to-side moving space of the piston part 40. For example, the body operation hole 22 may be formed in the side-to-side longitudinal direction of the body 21 so as to open both sides of the body 21, and form the side-to-side moving space for the operation part 50 and the piston part 40 disposed on either side of the operation part 50.

The body hydraulic hole 23 is formed in the body 21 so as to guide hydraulic pressure, and communicates with the body operation hole 22. For example, a pair of body hydraulic holes 23 may be obliquely disposed, and communicate with the body operation hole 22 so as to supply hydraulic pressure to between the pair of piston parts 40.

The body insertion hole 24 is formed in the body 21, and forms an insertion space of the motor part 30. For example, the body insertion hole 24 may be formed in the front-to-rear longitudinal direction of the body 21, and communicate with the body operation hole 22.

Figure 4:
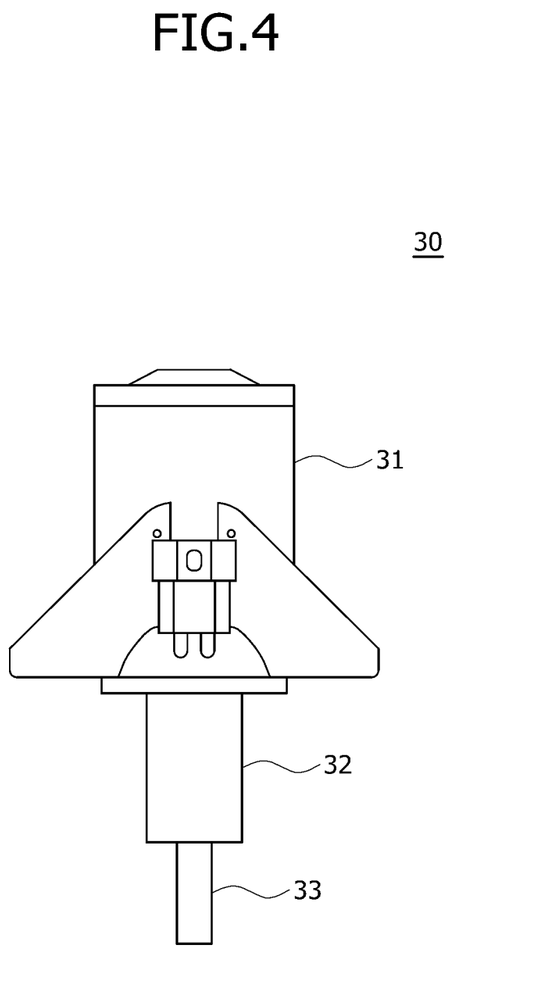
FIG. 4 is a diagram schematically illustrating a motor part in accordance with the embodiment of the present disclosure.

FIG. 4 is a diagram schematically illustrating the motor part in accordance with the embodiment of the present disclosure. Referring to FIG. 4, the motor part 30 in accordance with the embodiment of the present disclosure includes a motor case 31, a motor driver 32 and a motor shaft 33.

The motor case 31 is mounted in the housing part 20. For example, the motor case 31 may have a flange formed on the outside thereof so as to be bolt-coupled to the body 21.

The motor driver 32 is embedded in the motor case 31, and driven when power is applied. The motor shaft 33 is rotated by the motor driver 32, and moves the operation part 50. For example, the motor shaft 33 may be inserted into the body insertion hole 24.

Figure 5:
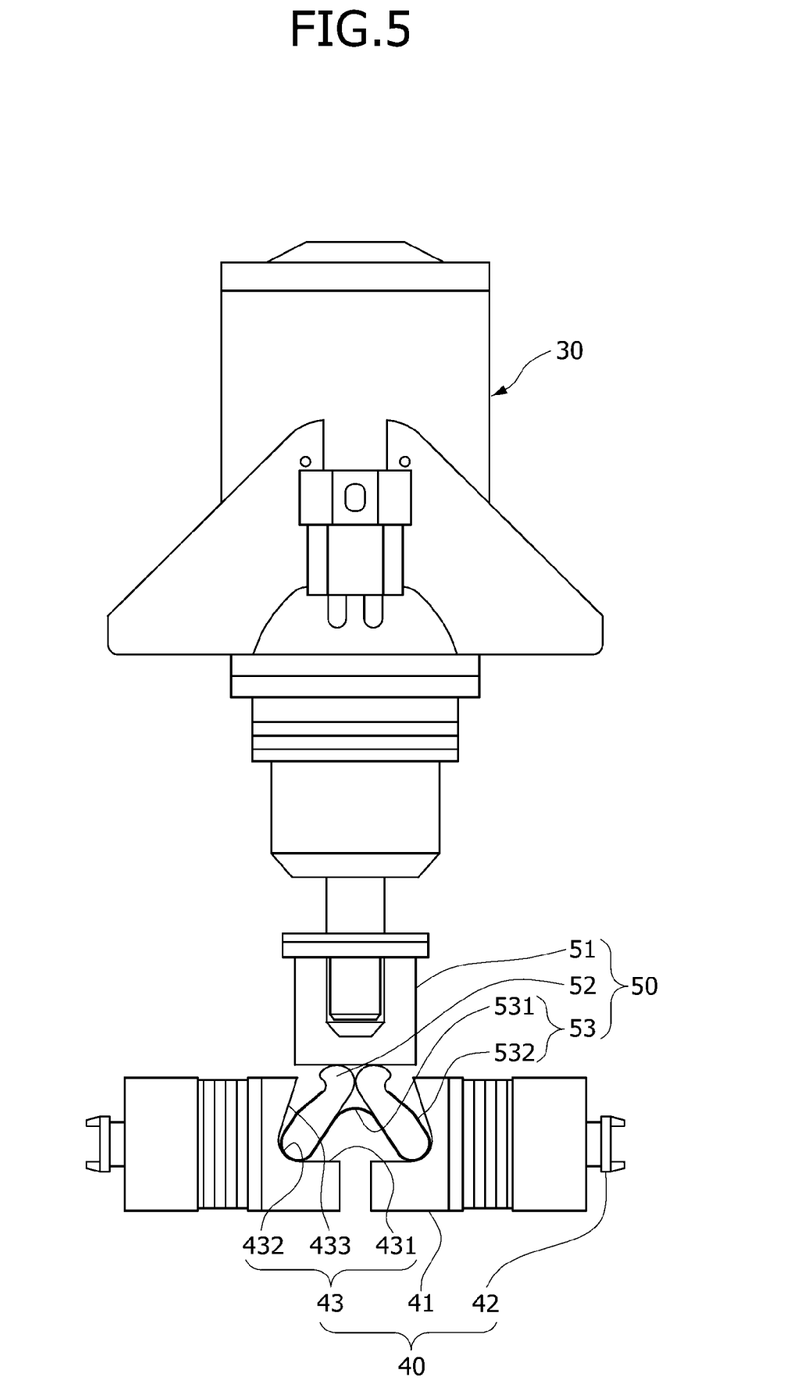
FIG. 5 is a diagram schematically illustrating a state in which an operation part and a piston part in accordance with the embodiment of the present disclosure are disposed.

FIG. 5 is a diagram schematically illustrating a state in which the operation part and the piston part in accordance with the embodiment of the present disclosure are disposed. Referring to FIG. 5, the piston part 40 in accordance with the embodiment of the present disclosure includes a pair of piston rod parts 41, a piston support part 42 and a piston transfer part 43.

The pair of piston rod parts 41 are inserted into the housing part 20. For example, the piston rod parts 41 may be inserted into the body operation hole 22, and disposed in a straight line. The piston rod part 41 may have one end exposed to the outside of the body 21. The piston rod part 41 may be sealed and pressed against the body operation hole 22 so as to block the introduction of external foreign matters while preventing an oil leak.

The piston support part 42 is formed at one end of the piston rod part 41, and supports the brake shoe 110. For example, the piston support part 42 may be exposed to the outside of the body 21, and have a concave central portion into which the brake shoe 110 can be inserted.

The piston transfer part 43 is formed at the other end of the piston rod part 41, and transfers a rotational force of the operation part 50 inserted into the piston transfer part 43. For example, the piston transfer part 43 may be formed in a groove shape at an end of the piston rod part 41, and linearly moved in the body operation hole 22 while pushed by the rotating operation part 50.

The piston transfer part 43 in accordance with the embodiment of the present disclosure may be formed at the other end of the piston rod part 41 and designed to have a recess shape to induce the insertion of the operation part 50. The piston transfer part 43 may include a transfer seating surface 431, a transfer curved surface 432 and a transfer inclined surface 433.

The transfer seating surface 431 may form a surface on which the operation part 50 is seated. For example, the transfer seating surface 431 may be a horizontal surface which is formed by a preset distance from the other end of the piston rod part 41 toward the one end thereof.

The transfer curved surface 432 is formed to have a curvature at the end of the transfer seating surface 431. The operation part 50 may be brought into surface contact with the transfer curved surface 432 and thus rotated. For example, the operation part 50 may be inserted into the transfer curved surface 432, and rotated to push the transfer curved surface 432. At this time, the transfer curved surface 432 may be designed to have a curvature corresponding to the operation part 50, such that the operation part 50 can be rotated at a predetermined angle.

The transfer inclined surface 433 is formed in an oblique direction from the transfer curved surface 432, and restricts the operation part 50 from rotating and separating. For example, the rotatable operation part 50 may be locked to the transfer inclined surface 433, and maintain the state in which the operation part 50 is inserted into the piston transfer part 43.

The operation part 50 in accordance with the embodiment of the present disclosure includes an operation nut part 51, a pair of operation pressurization parts 52 and an operation restoration part 53.

The operation nut part 51 is embedded in the housing part 20, and linearly moved by the motor part 30. For example, the motor shaft 33 may be screwed to the operation nut part 51. When the motor shaft 33 is rotated, the operation nut part 51 may be moved in the front-to-rear direction according to the rotation direction of the motor shaft 33. At this time, when the outer surface of the operation nut part 51 is formed in an angled shape and supported by the body 21, the operation nut part 51 may not be rotated but linearly moved.

The pair of operation pressurization parts 52 are supported by the operation nut part 51, and inserted into the respective piston transfer parts 43. The pair of operation pressurization parts 52 push the respective piston transfer parts 43 while rotated by the pressurization of the operation nut part 51. That is, the pair of operation pressurization parts 52 are obliquely disposed, the tops of the operation pressurization parts 52 are disposed adjacent to each other and supported by the operation nut part 51, and the bottoms of the operation pressurization parts 52 are separated from each other and supported by the piston transfer parts 43, respectively.

The operation restoration part 53 provides a restoring force to the operation pressurization part 52. For example, the operation restoration part 53 may be mounted on the pair of operation pressurization parts 52, and provide a restoring force to return the operation pressurization parts 52 to the original positions, when a pressurizing force applied to the operation pressurization parts 52 by the operation nut part 51 is removed. More specifically, the operation restoration part 53 includes a restoration center part 531 and a restoration coupling part 532. The operation restoration part 53 may be a plate spring.

The restoration center part 531 is disposed between the operation pressurization parts 52. For example, the restoration center part 531 may have a curvature in which an upper end thereof becomes the highest point.

The restoration coupling part 532 is extended from the restoration center part 531, and covers the operation pressurization part 52. For example, the restoration coupling part 532 may be extended in both directions from the restoration center part 531, and formed to cover a lower end portion of the operation pressurization part 52, thereby maintaining the state in which the operation pressurization part 52 and the operation restoration part 53 are coupled to each other.

Figure 6:
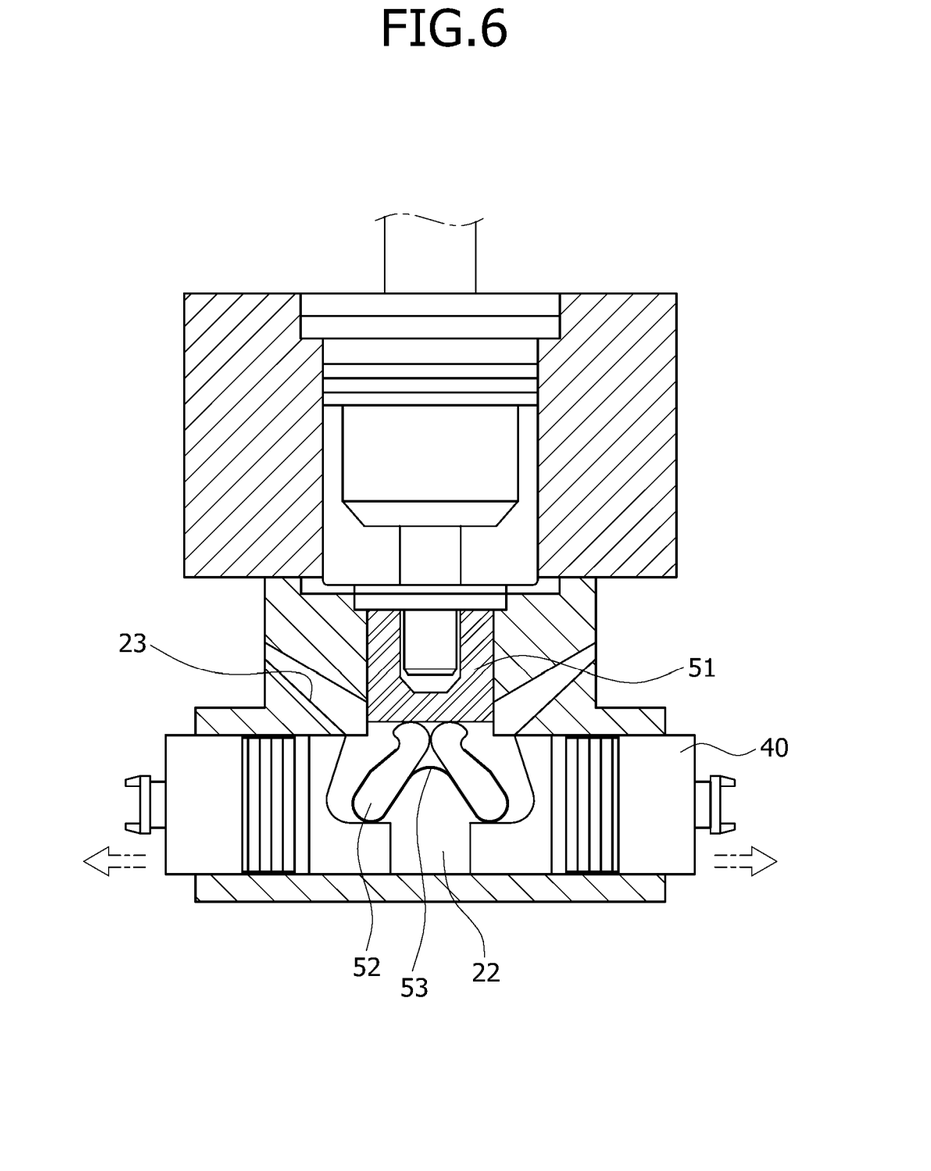
FIG. 6 is a diagram schematically illustrating a main braking state of the electronic parking brake device in accordance with the embodiment of the present disclosure.

FIG. 6 is a diagram schematically illustrating a main braking state of the electronic parking brake device in accordance with the embodiment of the present disclosure. Referring to FIG. 6, hydraulic pressure is introduced into the body operation hole 22 through the body hydraulic hole 23 during main braking. By the hydraulic pressure introduced into the body hydraulic hole 23, the piston parts 40 are moved to the left and right to push the brake shoes 110.

Figure 7:
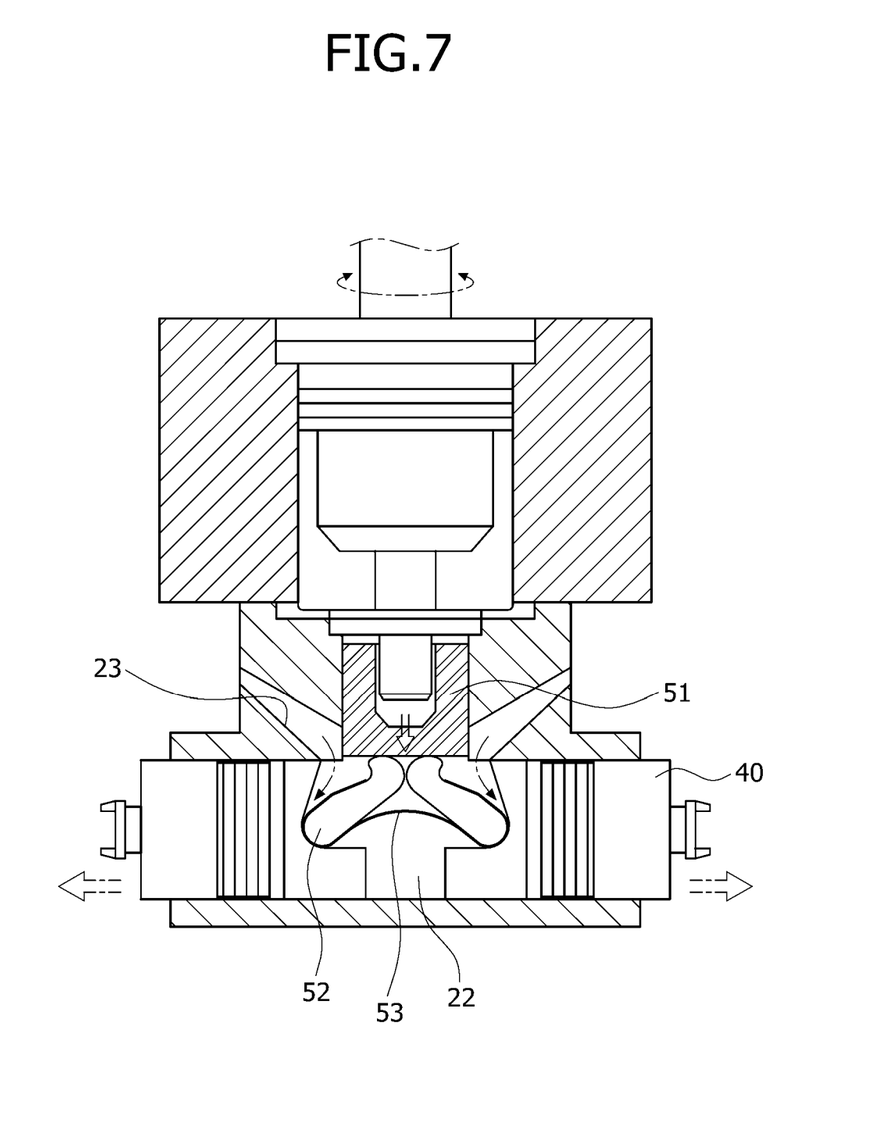
FIG. 7 is a diagram schematically illustrating a parking state of the electronic parking brake device in accordance with the embodiment of the present disclosure.

FIG. 7 is a diagram schematically illustrating a parking state of the electronic parking brake device in accordance with the embodiment of the present disclosure. Referring to FIG. 7, when power is applied to the motor part 30 during parking, the motor shaft 33 is rotated in one direction, and the operation nut part 51 engaged with the motor shaft 33 is linearly moved to pressurize the operation pressurization part 52.

The operation pressurization parts 52 are disposed in an oblique direction before pressurized by the operation nut part 51. The operation pressurization parts 52 are pressurized by the operation nut part 51 and rotated to push the respective piston parts 40. Therefore, the pair of brake shoes 110 are operated at the same time to perform braking for parking.

At this time, the pair of operation pressurization parts 52 are rotated by the pressurization of the operation nut part 51, such that the tops thereof are moved downward and the bottoms thereof are away from each other. The operation restoration part 53 is spread to form a restoration force.

When the parking brake is released, power is applied to the motor part 30 to rotate the motor shaft 33 in the other direction. Thus, the operation nut part 51 engaged with the motor shaft 33 is linearly moved to release the pressurization against the operation pressurization part 52.

When the pressurization against the operation pressurization part 52 is released, the operation pressurization part 52 may be returned to a standby state by the restoring force of the operation restoration part 53, and the piston part 40 may be returned to the original position by the restoring force of the brake shoe 110.

The electronic parking brake device 1 in accordance with the embodiment of the present disclosure may perform main braking using hydraulic pressure. Furthermore, while rotated by the operation of the motor part 30, the operation part 50 may push the piston parts 40 disposed on both sides of the operating part 50, thereby providing a parking braking force. At this time, the piston parts 40 may be disposed in the same space by the operation part 50, thereby reducing the size of a product.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An electronic parking brake device comprising:
a plate part having a brake shoe rotatably mounted thereon;
a housing part mounted on the plate part and configured to guide hydraulic pressure;
a motor part mounted on the housing part, and driven when power is applied thereto;
a piston part mounted on the housing part, and configured to be moved by hydraulic pressure so as to operate the brake shoe, the piston part comprising a pair of piston rod parts inserted into the housing part; and
an operation part embedded in the housing part, disposed between the piston rod parts, and driven by the motor part so as to push the piston rod parts,
wherein:
the piston part further comprises:
a piston support part formed at one end of each of the piston rod parts, and supporting the brake shoe; and
a pair of piston transfer parts, each formed at the other end of each of the piston rod parts, such that the operation part is inserted into the piston transfer parts, and configured to transfer a rotational force of the operation part; and
the operation part comprises:
a pair of operation pressurization parts, and each of bottoms of the operation pressurization parts is rotated to be away from each other to push the piston rod parts; and
an operation restoration part configured to provide a restoring force to the pair of operation pressurization parts; and the pair of operation pressurization parts are inserted into the respective piston transfer parts.

2. The electronic braking brake device of claim 1, wherein the housing part comprises:
a body having the motor part mounted therein;
a body operation hole formed in the body, and forming a side-to-side moving space of the piston part;
a body hydraulic hole formed in the body and configured to guide hydraulic pressure and communicate with the body operation hole; and
a body operation insertion hole formed in the body, and forming an insertion space of the motor part.

3. The electronic parking brake device of claim 1, wherein the motor part comprises:
a motor case mounted on the housing part;
a motor driver embedded in the motor case, and driven when power is applied thereto; and
a motor shaft rotated by the motor driver, and configured to move the operating part.

4. The electronic parking brake device of claim 1, wherein each of the piston transfer parts comprises:
a transfer seating surface having the operation part seated thereon;
a transfer curved surface having a curvature at an end of the transfer seating surface; and
a transfer inclined surface formed in an oblique direction from the transfer curved surface, and configured to restrict the operation part from rotating and separating.

5. The electronic parking brake device of claim 4, wherein the operation part is brought into surface contact with the transfer curved surface, and rotated.

6. The electronic parking brake device of claim 1, wherein:
the operation part further comprises an operation nut part embedded in the housing part, and configured to be linearly moved by the motor part; and
the pair of operation pressurization parts are supported by the operation nut part, and configured to push the respective piston transfer parts while rotated by the pressurization of the operation nut part.

7. The electronic parking brake device of claim 6, wherein tops of the pair of operation pressurization parts are disposed adjacent to each other and supported by the operation nut part, and bottoms of the pair of operation pressurization parts are obliquely disposed so as to be spaced apart from each other, and supported by the respective piston transfer parts.

8. The electronic parking brake device of claim 6, wherein the operation restoration part comprises:
a restoration center part disposed between the operation pressurization parts; and
a restoration coupling part extended from the restoration center part and covering the operation pressurization parts.

9. The electronic parking brake device of claim 8, wherein the restoration center part has a curvature in which an upper end thereof becomes the highest point.

\* \* \* \* \*